Patented May 29, 1923.

1,456,782

UNITED STATES PATENT OFFICE.

JOHANNES M. KESSLER, OF WEST ORANGE, NEW JERSEY, ASSIGNOR TO E. I. DU PONT DE NEMOURS & COMPANY, OF WILMINGTON, DELAWARE, A CORPORATION OF DELAWARE

CELLULOSE-ESTER COMPOSITION.

No Drawing. Application filed November 26, 1919. Serial No. 340,930.

*To all whom it may concern:*

Be it known that I, JOHANNES M. KESSLER, a citizen of the United States, and a resident of West Orange, in the county of Essex and State of New Jersey, have invented certain new and useful Cellulose-Ester Compositions, of which the following is a specification.

This invention relates to cellulose ester compositions containing glyceryl triacetate as a softening agent, either alone or in combination with camphor or suitable camphor substitutes. My invention pertains especially to pyroxylin plastics (i. e., cellulose nitrate compositions) in which some or all of the camphor ordinarily present is replaced by acetylated glycerol which is practically free from monoacetate of glycerol (monoacetin), and which contains at the most 25% of diacetate of glycerol (diacetin) and preferably not more than 5% thereof, the remainder being triacetate of glycerol (triacetin or glyceryl triacetate.)

In the course of an investigation to find softeners or camphor substitutes which were suitable from a commercial standpoint, I discovered that the introduction of an acyl group, such as an acetyl group, into an organic substance containing an hydroxyl group greatly increased the colloiding power of the organic substance for cellulose esters and was also attended by other advantages such as a lessening of the tendency of the organic substance to absorb moisture, and an increase in its stability.

With a knowledge of the general beneficial effects resulting from the introduction of an acyl group it was decided to carry out experiments on the various acetyl derivatives of glycerol, despite the fact that the acetins had been tried at various times in the past by manufacturers of pyroxylin plastics and had been found undesirable.

The application of the commercial acetate of glycerine as a solvent or colloiding agent for pyroxylin was patented as long ago as 1889 by Schüpphaus in Patent 410208, and is included as part of the invention in the provisional specification of British Patent 13,131 of 1900 to Goldsmith. In more recent years patents have been granted covering its use in connection with cellulose acetate. Although known for so many years acetin has never found, as far as I know, practical application in the pyroxylin industry.

The main objection to the use of acetin, and one which accounts for its having been discarded by manufacturers as a substitute for camphor, was recognized by Schüpphaus himself, as appears from the following statement in his Patent No. 598,648 granted in 1898 (lines 16 to 26 of page 1).

"In my former patent of the United States No. 410,208, of September 3, 1889, I have pointed out the utility of the acetins—i. e., the acetates or acetic esters of glycerol—in the manufacture of highly-viscous pyroxylin solutions and of solid compounds possessing great flexibility. I have, however, found that in atmospheres heavily charged with moisture these compounds may become covered with water, owing to the hygroscopic nature of the acetins."

The remedy which Schüpphaus proposes is to introduce the radical of an acid other than acetic acid into the acetins. Although the resulting mixed esters may be an improvement over commercial acetin in not being so hygroscopic, they also as far as I know have not found practical application, undoubtedly due to their more complicated method of manufacture and their relatively high cost.

My researches have now made clear the following facts:

The commercial acetate of glycerol consists of a mixture of mono, di, and triacetin. The monoacetin is a very hygroscopic product, easily soluble in water; diacetin, although less hygroscopic, is quite soluble in water; whereas triacetin is the least soluble. Owing to the fact that monoacetin readily absorbs moisture from the atmosphere, it is obviously not suitable for use in pyroxylin compounds, particularly pyroxylin solutions, as it forms a white film. Diacetin absorbs moisture to a less degree and when used alone also gives a white film, but when used with a sufficient amount of triacetin produces a transparent film. It can, therefore, easily be seen why commercial acetate of glycerol has not been found of practical importance in the pyroxylin industry.

With the above facts in mind experiments were carried out with an acetin consisting as nearly as practically possible of nothing but glyceryl triacetate. The known commercial methods do not yield such a product, as will be seen from the following analysis of a high grade acetin obtainable in the market at the present time:—

Triacetin_____ 65.23%
    Diacetin_____ 31.71%
    Acetic acid_____ 3.04%

Other commercial acetins contain even higher percentages of diacetin as well as some monoacetin. It therefore became necessary to devise a process which would greatly increase the proportion of triacetin.

Experiments were first carried out with an acetin free from monoacetin and containing from 75 to 85% of triacetin; the resulting pyroxylin plastics were very satisfactory, being devoid of the objectionable features attending the use of the ordinary commercial acetins. I finally devised a process whereby a remarkably pure glyceryl triacetate could be obtained; this process is as follows:—

Glycerol (1 mol.) is treated with glacial acetic acid (6 mols.) and 0.1% sulfuric acid as catalyzer, and there is distilled off, through a very efficient column, in the form of dilute acetic acid, the water formed during the reaction, until the strength of the acid coming over reaches 90%. About $\frac{1}{2}$ molecule of acetic anhydride is then added and the mixture refluxed for one hour. After neutralizing the catalyzer with sodium acetate and distilling off the excess of free acetic acid as far as possible at ordinary pressure, the residue is then subjected to fractional distillation in vacuum, yielding a final neutral product with more than 95% triacetin, and in some cases as high as 97% triacetin.

Comparative tests indicate that an acetin containing at least 95% of triacetin gives a better pyroxylin plastic than an acetin containing 85% triacetin.

Additional tests carried out with this relatively pure glyceryl triacetate proved it to be an almost ideal substance to replace all or part of the camphor in cellulose ester plastics, such as celluloid, pyralin, etc. Not only is it an excellent solvent for the pyroxylin used in these plastics, but its freedom from odor, its water-white color, low rate of evaporation, great stability under the conditions employed, ease of manufacture, and particularly its low cost when compared with the present high camphor price, make it an exceedingly valuable camphor substitute.

To illustrate one embodiment of my invention the following example may be cited:—

To 100 parts by weight of pyroxylin, preferably anhydrous, is added 60 parts by weight of denatured alcohol and 31 parts by weight of 95% triacetin. The mixture is kneaded, preferably at an elevated temperature of from 40 to 55° C., until properly colloided, after which it is put on the rolls and through the different operations, such as rolling, cake pressing, sheeting and seasoning, which are well known in the manufacture of cellulose nitrate plastics, such as pyralin, celluloid, etc. Suitable amounts of stabilizer, for example, urea, pigments and colors may be added either during the mixing or the rolling operation. The proportion of the ingredients given above may be varied within certain limits. Also other solvents, such as wood alcohol, acetone, etc., may be used in place of denatured alcohol. If a certain amount of camphor or another camphor substitute besides triacetin is used, the amount of triacetin necessary for proper colloiding is decreased; preferably the total amount of camphor and camphor substitutes including the triacetin is not more than 31 parts for about 100 parts of nitrocellulose.

Liquid coating compositions may be made from the above described plastics by adding sufficient solvent, for example methyl-alcohol and an alkyl acetate, such as ethyl or amyl acetate, to produce a thin or a viscous solution. By flowing the viscous solution on to smooth surfaces, sheets or films having very desirable properties are readily obtained, after evaporation of the solvent.

I claim:

1. A composition comprising a cellulose ester and an acetin substantially free from monoacetin and containing from about 75 to 97% of triacetin and from about 25 to 3% of diacetin.

2. A composition comprising a cellulose ester and an acetin substantially free from monoacetin and containing from about 85 to 95% of triacetin and from about 15 to 5% of diacetin.

3. A composition comprising a cellulose ester and an acetin substantially free from monoacetin and containing about 95% of triacetin and about 5% of diacetin.

4. A composition comprising pyroxylin and an acetin substantially free from monoacetin and containing at least 75% of triacetin.

5. A composition containing pyroxylin and an acetin substantially free from monoacetin and containing more than 85% of triacetin.

6. A composition containing pyroxylin and an acetin substantially free from monoacetin and containing about 95% of triacetin.

7. A composition containing a cellulose nitrate and an acetin substantially free from monoacetin and containing about 95% of triacetin and about 5% of diacetin.

8. A composition comprising a cellulose ester and an acetin substantially free from monoacetin and having at least 3% of diactein and such a high triacetin content as to prevent the formation of a white surface film when said composition is in contact with an atmosphere containing moisture.

9. A composition comprising pyroxylin and an acetin substantially free from monoacetin and having such a high triacetin content as to prevent the formation of a white surface film when said composition is in contact with an atmosphere containing moisture.

10. A composition consisting essentially of cellulose nitrate, a softener comprising acetin substantially free from monoacetin and containing at least 75% of triacetin, and a solvent for said nitrate and said acetin.

11. A composition consisting essentially of cellulose nitrate, a softener comprising acetin substantially free from monoacetin and containing at least 75% of triacetin, and a solvent for said nitrate and said acetin comprising an alcohol and an alkyl acetate.

12. A composition consisting essentially of cellulose nitrate and a softener comprising acetin substantially free from monoacetin and containing at least 75% of triacetin, the ratio of said cellulose nitrate to said softener being about 3 to 1.

13. A composition consisting essentially of cellulose nitrate and a softener comprising camphor and an acetin substantially free from monoacetin and containing more than 85% of triacetin.

14. A composition consisting essentially of cellulose nitrate and a softener comprising camphor and an acetin substantially free from monoacetin and containing more than 85% of triacetin, the ratio of said cellulose nitrate to said softener being about 3 to 1.

15. A composition consisting essentially of cellulose nitrate and a softener comprising camphor and an acetin substantially free from monoacetin and containing about 95% of triacetin.

In testimony whereof I affix my signature.

JOHANNES M. KESSLER.